United States Patent [19]

Knapp

[11] Patent Number: 4,971,112

[45] Date of Patent: Nov. 20, 1990

[54] CARTRIDGE FOR FAUCETS HAVING SMALL PLATES OF HARD MATERIAL AND A METALLIC COVERING

[75] Inventor: Alfons Knapp, Biberach an der Riss, Fed. Rep. of Germany

[73] Assignee: Masco Corporation of Indiana, Indianapolis, Ind.

[21] Appl. No.: 341,410

[22] PCT Filed: May 27, 1988

[86] PCT No.: PCT/US88/01808

§ 371 Date: Jan. 27, 1989

§ 102(e) Date: Jan. 27, 1989

[30] Foreign Application Priority Data

Jun. 1, 1987 [IT] Italy .................. 67470 A/87

[51] Int. Cl.⁵ .................................... F16K 11/06
[52] U.S. Cl. .................. 137/625.4; 137/454.6; 137/625.17; 251/368
[58] Field of Search ............. 137/454.6, 625.17, 625.4, 137/625.41; 251/368

[56] References Cited

U.S. PATENT DOCUMENTS

| | | | |
|---|---|---|---|
| 4,226,260 | 10/1980 | Schmitt | 137/625.17 X |
| 4,502,507 | 5/1985 | Haymann | 137/625.4 |
| 4,610,268 | 9/1986 | Knapp | 137/625.17 X |
| 4,733,694 | 3/1988 | Knapp | 137/625.17 X |
| 4,738,281 | 4/1988 | Limet et al. | 137/625.17 |

Primary Examiner—John Rivell
Attorney, Agent, or Firm—Edgar A. Zarins; Malcolm L. Sutherland

[57] ABSTRACT

A cartridge for faucets having some parts which are assembled in the cartridge to function as a guide, an element of support for a movable small plate of hard material, forming a part of the above mentioned guiding parts, at least one small plate of hard material operatively mounted and fixed in the cartridge, and at least one movable small plate mounted in the aforementioned element of support and adapted to be movable in relation to the fixed small plate in order to bring about the regulation of fluid flow and the proportion of mixing. At least one of the surfaces of the parts of plastic material, adapted to slide against the surface of other pieces of plastic material, is provided with a metal layer, preferably by chemical or electrochemical means. It is preferred that the metal cover is applied on an intermediate part having surfaces adapted to slide in contact with different parts of plastic material, and precisely on a guiding ring.

12 Claims, 1 Drawing Sheet

CARTRIDGE FOR FAUCETS HAVING SMALL PLATES OF HARD MATERIAL AND A METALLIC COVERING

BACKGROUND OF THE INVENTION

I. Field of the Invention

The present invention relates to a cartridge adapted to be inserted in the body of a faucet, including a guide, an element of support for a movable small plate of hard material positioned within the guiding parts, at least one small plate of hard material which is fixedly mounted in the cartridge, and at least one movable small plate mounted in the element of support and adapted to move against the fixed small plate in order to effectuate the regulation of the rate of fluid flow and of the proportion of mixing.

II. Description of the Prior Art

In the usual construction, the element of support for the movable small plate and the parts which function as a guide are made of plastic material and their reciprocal sliding is facilitated by properly chosen plastic material and a lubricating grease. However, with time, the lubricating grease is expended, the plastic material loses its self-lubrication, and an excessive friction begins to develop between the parts which are subjected to a reciprocal sliding movement resulting in a clatter which is very unpleasant to the user. This inconvenience can be overcome in certain constructions by inserting thin gaskets of metallic foil between the parts of plastic material which are subjected to a reciprocal sliding movement. In fact, a proper choice of metallic material permits the avoidance of the development of excessive friction and of the noise which occurs with time when there is movement. However, the insertion of these gaskets has a relatively high cost, not only for their construction but because of the complications that they bring to the assembly of the cartridge. Further, this is not even possible in certain cases; for example, when one of the parts has a lamellar structure, an elevated structure or other structures which are destined to stop the vibration and the noise of the water flow.

SUMMARY OF THE PRESENT INVENTION

The scope of the present invention is to obtain a cartridge of the type described, in which the damaging phenomena of the prior known system is prevented by economical means and without introducing any complication of assembly.

This goal can be attained, according to the present invention, by providing at least one of the surfaces of the parts made of plastic material adapted to be submitted to sliding against the surfaces of other parts of plastic material, is provided with a thin metallic deposit on the surface thereof.

In a way which is well known, this deposition can be done by chemical or electrochemical means—previous sensitization of the surface, and eventual intermediate deposition of an adherent layer—and a similar process which has preferable results. However, the deposition of the metal layer on the gasket can also be done with other processes, for example, through deposition under a vacuum. -. The metal used to form the gasket layer can be chosen according to various criteria but chromium is particularly adapted for this function. The chromium layer is preferably applied on intermediate adherent layers of copper and/or nickel.

It is advantageous if only one of the two surfaces of the plastic parts adapted to slide in reciprocal contact is covered with metallic material. From a functional standpoint, it does not matter if the covering is applied to one or the other of the two cooperating surfaces. However, in the cases in which the couplings that one wants to line with a metallic layer are more than one, there is a particular advantage obtained by effectuating the covering on an intermediate part, which has at least two surfaces and which are adapted to slide in contact with other parts of plastic material. In fact, in this way, the treatment of one piece is sufficient to line two pairs of sliding surfaces; in many cases, this represents the total number of surface pairs of a cartridge which are important to the application of the invention. In particular, in the cartridges which have a revolving guide ring across which moves the movable small plate of hard material, it is particularly advantageous to plate the principle surfaces of this guide ring with chromium.

Other objects, features and advantages of the present invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 2 is a partial cross-sectional perspective of the flow cartridge of the present invention taken along line II—II of FIG. 1;

DETAILED DESCRIPTION OF A PREFERRED EMBODIMENT OF THE PRESENT INVENTION

Figure 1:
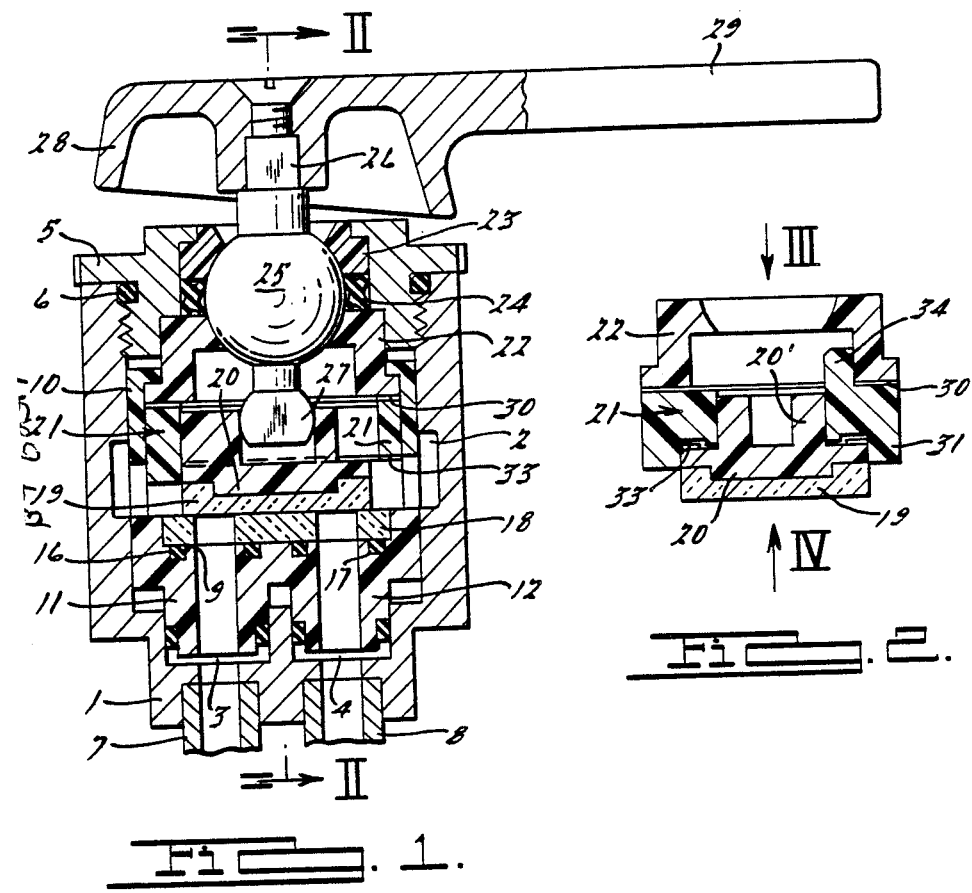
FIG. 1 is a cross-sectional perspective of a faucet embodying the flow cartridge of the present invention.

The faucet and the respective cartridge, described herein and illustrated in the drawing, are examples of known structures which are described here for clearness of understanding only. However, it is to be understood that the application of the invention is not, in any way, limited to these particular types of faucets or cartridges.

The mixing faucet embodying the present invention and shown in FIG. 1 includes body 1 at the bottom of which there are two flow passages 7 and 8 through which the hot and cold water are respectively supplied and which communicate with parts 3 and 4 shown at the bottom of body 1 of the faucet. Body 2 has an internal rim adapted to house a cartridge, and forms a cylindrical chamber 2 which communicates with an outlet passageway which is not shown. The body 1 is closed by a cover 5 having a sealing gasket 6.

The cartridge, which in its realized form represents a complete and interchangeable cartridge, includes a cover 10 which forms an enclosure constructed of plastic material and having axial mobility within the faucet body 1. In this case, the enclosure 10 has a bottom 9 which extends to form two sealed ports 11 and 12 which extend through the seals 3 and 4 of the faucet body I, which communicate with pipes, 7 and 8, in which hot and cold water are supplied. The bottom of enclosure 10, on which the parts 11 and 12 are found, form the element of support for the fixed plate 18 of hard material of the faucet. This makes a seal with the bottom 9 due to gaskets 16 and 17, inserted in corresponding seats formed in the bottom 9 of the enclosure 10. The plate 18 has two apertures corresponding to the ports 11 and 12, for the passage of hot and cold water, respectively.

In contact with the fixed plate 18 a movable plate 19 of hard material is mounted, supported by a control slide 20 that is guided in a way that enables it to move within a guide ring 21, and also mounted in such a way that it can revolve in enclosure 10. Not only the slide 20 but also the ring 21 are preferably made of plastic material. The ring 21 bears against a semi-bearing 22 which is fixed at the mouth of enclosure 10 and is also made of a plastic material. Further, the semi-bearing 22 engages cover 5 which encloses the body of the faucet. Another semi-bearing 23 is positioned in cover 5, and between the semi-bearings 22 and 23, an articulation sphere 25 is inserted with a sealing gasket 24. The sphere 25 supports an arm 26 to which is connected a cap 28 with a control lever 29. Towards the inside, a second arm 27 is connected to sphere 25. This second arm 27, which is planar and functions like a small key, is fixedly connected to control slide 20. This well-known arrangement permits, by making lever 29 rotate and pivot variably, the movement of the control slide 20. As a result, the movable plate 19, which also moves and rotates variably when lever 29 is moved, slides and rotates with respect to the fixed plate 18 in order to regulate the fluid flow that is supplied from the pipes 7 and 8 and mixes in the ring-like chamber 2 from which a mixed flow is delivered.

The slide 20 moves in direct contact with the guide ring 21 which also rotates in direct contact with the semi-bearing 22. There are, therefore, two cooperating surfaces of plastic material that can move in reciprocal contact. This movement takes place under considerable pressure. Due to the fact that the necessary pressure for an effective cooperation of the movable plate 19 and fixed plate 18 is transmitted across these surfaces, the pressure transmitted is notably greater than that which is needed for the cooperation between the small plates of hard material. For this reason, a lubricating grease that one can insert at the moment that the cartridge is assembled between the members 20 and 21, and 21 and 22, is gradually expended. On the other hand, the parts of plastic material, even if they are initially produced with the characteristics of auto-lubrification, with time lose these characteristics because they operate in the presence of hot water. As a result, a considerable friction is created between parts 20, 21 and 22. This friction hinders the movement of the faucet and further, the maneuvering of the faucet is accompanied with unpleasant clattering and vibrations.

The insertion of thin, metallic gaskets between parts 20, 21 and 22 avoids this inconvenience, and this is possible to accomplish, but it makes the operation of assembling the cartridge notably more complex and delicate. Further, to obtain a favorable operation, one cannot use a plate of common stainless steel, but one must use, for example, a little plate of chrome plated brass. All this reflects an acceptable but difficult way to produce the cartridge, in terms of both the cost and the configuration of production.

However, with the application of the present invention, the surfaces of the guide ring 21 that work in contact with the surfaces of slide 20 and semi-bearing 23, are covered by a layer of metal of an adequate nature, preferably chromium. In this way, the control movements do not take place between surfaces of plastic material but between surfaces of plastic material and metallic surfaces similar to the case in which a metallic plate is inserted between the parts. Further, assembly of the cartridge takes place in a way which completely corresponds to that of a cartridge without metallic gaskets. Due to the fact that the procedures of metallization of the plastic surfaces are up to date and sufficiently economical, the cost of manufacturing the cartridge, according to the present invention, is not substantially increased with respect to a cartridge without metallic gaskets, and results in a lower cost as compared to that obtained with a cartridge which has metallic gaskets inserted.

Figure 4:
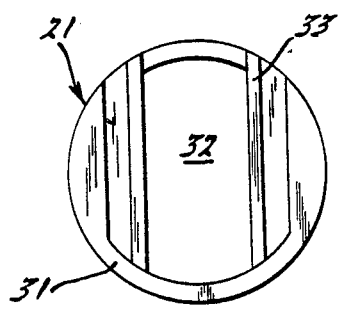
FIG. 4 is a plan view of the guide ring of the invention viewed along line IV—IV of FIG. 2.
Figure 3:
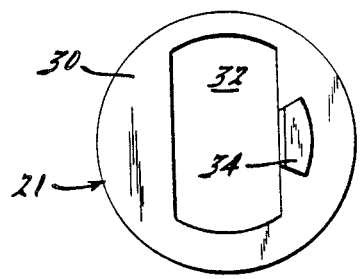
FIG. 3 is a plan view of the guide ring of the invention viewed along line III—III of FIG. 2.

As shown in FIGS. 2 and 4, the guide ring 21 presents a surface which works in contact with the semi-bearing 22, and this surface of the guide ring is provided with a metallic covering 30. From this, a projection 34 extends which cooperates with internal projections (not shown) of the semi-bearing 22 in order to properly limit the field of rotation of the guide ring 21.

On the opposite side, the guide ring 21 peripherally includes a protruding frame 31 which sets the boundaries for a frame in which the slide 20, which carries the movable plate 19, can move. Also, the ring 21 has a window 32 in which a protrusion 20a of the slide 20, which forms the place for the maneuvering key, extends. The surfaces between the elevated frame 31 and the window 32 are also lined with a metallic covering 33. Naturally, in the drawing, the thickness of the layers 30 and 33, which if correctly represented in scale would not be perceivable, is exaggerated.

In this way, not only the movement of slide 20 against surface 33 of the guide ring 21, but also the sliding of surface 30 of the guide ring 21 against the semi-bearing 22 occurs between plastic and metal materials. Further, with the proper selection of materials, a low friction coefficient and silent, regular movements can be obtained even in the absence of lubrication and after an extended period of use.

The fact that the metallization is executed on the two surfaces, 30 and 33, of ring 21 instead of on the corresponding surfaces of semi-bearing 22 and, respectively, of slide 20 offers the advantage that only one component of the cartridge is required to be submitted to the metallization treatment thereby reducing costs. Naturally, an eventual metallization of other surfaces of the guide ring 21, other than surfaces 30 and 33, does not cause any inconvenience. Rather, the metallization of the internal walls of the window 32 facilitates the sliding of the protrusion 20a of slide 20 and the metallization of the external surface, having the form of a mantle, or ring 21 facilitates the rotation of it inside the enclosure 10. However, these last movements are not critical because they occur without the application of substantial pressure. Nevertheless, the piece 21 can be submitted to metallization without any precautions to protect part of its surfaces. This makes the operations of sensitization, adherent covering and final chrome plating particularly simple, in the case in which the metallization is done with a chemical process followed by an electrochemical process, as is usually done and is particularly advantageous when using plastic material.

It is important to note that the metallization is not hindered by a complex configuration for the surface that must receive it. If it is required, the surface can have some lamellar configurations or other configurations which facilitate to control premature closing and to stop noise associated with the fluid flow.

The use of chromium to make the final metallization (preferably applied on intermediate adherent layers of copper and/or nickel) offers excellent results. However, other metals can be applied and, it must be noted, that consideration must be given to the thickness of the metal layer which must be very thin in order to be applied as thin layers in metallization, and therefore, consuming a minimal quantity of metal which allows the use of more expensive metals without greatly increasing the cost of production.

As aforementioned, the application of the invention is not linked to any particular configuration of the cartridge parts. The illustrated realized form has not other goal but to furnish an example of complete actualization. Thus, for example, the cartridge could have a guide ring which does not revolve, or the slide that carries the movable plate could be guided by parts integrally formed with the enclosure with the covering of the cartridge. Furthermore, the cartridge does not necessarily have to be a true, proper, complete, interchangeable cartridge as a unit, but the invention can also be applied in cases in which the cartridge is made by an assembly of parts, which are inserted in the body of the faucet but which together do not form an interchangeable unit.

The foregoing detailed description has been given for clearness of understanding only and no unnecessary limitations should be understood therefrom as some modifications will be obvious to those skilled in the art without departing from the scope and spirit of the appended claims.

I claim:

1. In a fluid flow control cartridge for a faucet having a body, the cartridge including a housing adapted to be inserted in the body of the faucet, the housing having a slider element operatively connected to a control handle of the faucet for controlling sliding movement of at least one movable plate of hard material with respect to at least one fixed plate of hard material to regulate fluid flow through the cartridge, the slider element positioned within guide means for limiting the movement of the slider element, the slider element and guide means having cooperating selectively engageable surfaces, the improvement comprising:
   bonding a layer of metallic material on the cooperating selectively engageable surface of at least one of the slider element and the guide means.

2. The improved cartridge as defined in claim 1 wherein said cooperating surface of at least one of the slider element and the guide means is sensitized prior to bonding of said metallic layer by intermediate deposition of at least one layer of an adherent.

3. The improved cartridge as defined in claim 2 wherein said bonding of said metallic layer is done through chemical deposition means.

4. The improved cartridge as defined in claim 2 wherein said bonding of said metallic layer is done through electrochemical deposition means.

5. The improved cartridge as defined in claim 2 wherein said bonding of said metallic layer is done under a vacuum.

6. The improved cartridge as defined in claim 2 wherein said metallic layer consists of a chrome material.

7. The improved cartridge as defined in claim 6 wherein said intermediate adherent layer consists of a copper material.

8. The improved cartridge as defined in claim 6 wherein said intermediate adherent layer consists of a nickel material.

9. The improved cartridge as defined in claim 2 wherein the cartridge includes a semi-bearing engaging the guide means, the guide means slidably movable against the semi-bearing, the guide means and the semi-bearing having cooperating engageable surfaces, the guide means having said engageable surface deposited with a layer of metallic material.

10. In a fluid flow control cartridge for a faucet having a body, the cartridge including a housing adapted to be inserted in the body of the faucet, the housing having a slider element operatively connected to a control handle of the faucet for controlling sliding movement of at least one movable plate of hard material with respect to at least one fixed plate of hard material to regulate fluid flow through the cartridge, the slider element positioned within guide means for limiting the movement of the slider element, the slider element and guide means having cooperating selectively engageable surfaces, the improvement comprising:
   depositing a layer of metallic material on the cooperating selectively engageable surface of at least one of the slider element and the guide means, said cooperating surface of at least one of the slider element and the guide means being sensitized prior to deposition of said metallic layer by intermediate deposition of at least one layer of an adherent.

11. In a fluid flow control cartridge for a faucet having a body, the cartridge including a housing adapted to be inserted in the body of the faucet, the housing having a slider element operatively connected to a control handle of the faucet for controlling sliding movement of at least one movable plate of hard material with respect to at least one fixed plate of hard material to regulate fluid flow through the cartridge, the slider element positioned within the guide means for limiting the movement of the slider element, the slider element and guide means having cooperating selectively engageable surfaces, the improvement comprising:
   bonding deposition of a layer of metallic material on the cooperating selectively engageable surface of at least one of the slide element and the guide means.

12. The improved cartridge as defined in claim 11 wherein said cooperating surface of at least one of the slider element and the guide means is sensitized prior to bonding deposition of said metallic layer by intermediate bonding deposition of at least one layer of a metallic adherent.

* * * * *